US012019811B2

(12) United States Patent
Goslin

(10) Patent No.: US 12,019,811 B2
(45) Date of Patent: Jun. 25, 2024

(54) SYSTEMS AND METHODS TO CAUSE AN INPUT DEVICE TO PROVIDE MOVEMENT-BASED OUTPUT

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 127 days.

(21) Appl. No.: 16/851,470

(22) Filed: Apr. 17, 2020

(65) Prior Publication Data

US 2021/0325975 A1    Oct. 21, 2021

(51) Int. Cl.
*G06F 3/033*    (2013.01)
*G06F 3/0354*   (2013.01)

(52) U.S. Cl.
CPC .......... *G06F 3/033* (2013.01); *G06F 3/03543* (2013.01)

(58) Field of Classification Search
CPC .............................. G06F 3/033; G06F 3/03543
See application file for complete search history.

(56) References Cited

U.S. PATENT DOCUMENTS

| | | | | |
|---|---|---|---|---|
| 5,044,956 A * | 9/1991 | Behensky | ............... | A63F 13/57 434/45 |
| 5,405,152 A * | 4/1995 | Katanics | ................. | A63F 13/06 463/2 |
| 5,513,100 A * | 4/1996 | Parker | .................. | G05B 19/427 318/568.18 |
| 5,576,727 A * | 11/1996 | Rosenberg | ............. | G01B 5/008 345/179 |
| 5,825,308 A * | 10/1998 | Rosenberg | ............ | G06F 3/0354 341/20 |
| 5,828,197 A * | 10/1998 | Martin | .................... | A61B 34/71 318/567 |
| 5,956,484 A * | 9/1999 | Rosenberg | ............. | G06F 3/011 709/203 |
| 5,990,869 A * | 11/1999 | Kubica | ................... | G06F 3/016 33/1 M |
| 5,999,168 A * | 12/1999 | Rosenberg | ............. | A63F 13/06 345/161 |
| 6,100,874 A * | 8/2000 | Schena | .................. | G01B 5/008 345/157 |
| 6,243,078 B1 * | 6/2001 | Rosenberg | ............. | A63F 13/06 345/161 |
| 6,697,043 B1 * | 2/2004 | Shahoian | ................ | A63F 13/06 345/156 |

(Continued)

*Primary Examiner* — Xuemei Zheng
(74) *Attorney, Agent, or Firm* — Esplin & Associates, PC

(57) ABSTRACT

This disclosure presents systems and methods to cause an input device to provide movement-based output. Exemplary implementations may: establish a wireless connection between the one or more physical processors and an input device, the input device being configured to provide control signals for controlling a graphical user interface; determine motion control signals for the input device, the motion control signals dictating physical movement of the input device in a real-world environment; effectuate communication of the motion control signals to the input device thereby causing the input device to perform the physical movement in the real-world environment; and/or perform other operations.

20 Claims, 6 Drawing Sheets

(56) References Cited

U.S. PATENT DOCUMENTS

| | | | | |
|---|---|---|---|---|
| 7,106,313 B2* | 9/2006 | Schena | ............... | G05G 9/047 |
| | | | | 345/157 |
| 7,137,107 B1* | 11/2006 | Brown | ................ | G06F 9/542 |
| | | | | 717/137 |
| 7,307,619 B2* | 12/2007 | Cunningham | ......... | G06F 3/016 |
| | | | | 345/158 |
| 7,404,716 B2* | 7/2008 | Gregorio | ............. | G09B 23/285 |
| | | | | 434/262 |
| 10,613,629 B2* | 4/2020 | Laurendeau | ........ | G06F 3/04845 |
| 2004/0106916 A1* | 6/2004 | Quaid | .................. | A61B 34/76 |
| | | | | 606/1 |
| 2008/0084384 A1* | 4/2008 | Gregorio | ............... | G06F 3/016 |
| | | | | 345/156 |
| 2012/0065784 A1* | 3/2012 | Feldman | .............. | G06F 3/016 |
| | | | | 700/280 |
| 2012/0139841 A1* | 6/2012 | Taylor | ................... | G06F 3/016 |
| | | | | 345/168 |
| 2018/0369691 A1* | 12/2018 | Rihn | ..................... | A63F 13/25 |

* cited by examiner

SYSTEMS AND METHODS TO CAUSE AN INPUT DEVICE TO PROVIDE MOVEMENT-BASED OUTPUT

FIELD

This disclosure relates to systems and methods to cause an input device to provide movement-based output.

BACKGROUND

Existing input devices, such as computer mice, stylus, and/or game controllers, are passive devices that are meant to be controlled by a user.

SUMMARY

One aspect of the disclosure relates to a system configured to cause an input device to provide movement-based output. Interactive game experiences traditionally do not use input devices as active game assets that can participate in the interactive game experiences. One or more implementations may control physical movement in a real-world environment of otherwise passive input devices based on one or more of a determined path, determined motion control signals, and/ or other information. In some implementations, a path may be based on user input via a secondary input device that is remote from a given input device and/or controlled by a remote user. In some implementations, a path may be determined based on virtual movement of a virtual object in a simulated space of gameplay, and/or other input. In some implementations, motion control signals may dictate the physical movement along a determined path. Such system may facilitate motor learning for a user (e.g., with motor disabilities) associated with the input device, technology learning (e.g., for elderly users), interactive gameplay or experiences where the input device may be a companion for example, and/or other implementations.

One or more implementations of a system configured to cause an input device to provide movement-based output may include one or more of one or more servers, one or more computing platforms, one or more input devices, and/or other components. The one or more servers may include one or more physical processors. The one or more servers may communicate with one or more computing platforms via client/server architecture, and/or other communication schemes. The one or more servers may communicate with one or more input devices via client/server architecture, and/or other communication schemes. In some implementations, the features and/or functionality attributed to the one or more servers may be carried by individual computing platforms. The one or more physical processors may be configured by machine-readable instructions. Executing the machine-readable instructions may cause the one or more physical processor to facilitate causing an input device to provide movement-based output. The machine-readable instructions may include one or more computer program components. The computer program components may include one or more of a communication component, control component, and/or other components.

The communication component may be configured to establish a wireless connection between one or more physical processors and an input device. The input device may otherwise be a passive input device configured to provide control signals for controlling a graphical user interface based on user control of the input device. The input device may include one or more of one or more drive components, one or more wireless communication devices, and/or other components. The one or more drive components may be configured to cause the physical movement of the input device. The one or more drive components may include one or more of a vibration motor, a motorized wheel, one or more rotor blades, and/or other components that may cause physical movement. The input device may include one or more of a computer mouse, a stylus, a game controller, and/or other input devices.

The control component may be configured to determine motion control signals for the input device. The motion control signals may dictate physical movement of the input device in a real-world environment.

The communication component may be configured to effectuate communication of the motion control signals to the input device. Thus, input device may perform the physical movement in the real-world environment.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "effectuate" (and derivatives thereof) may include active and/or passive causation of any effect.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
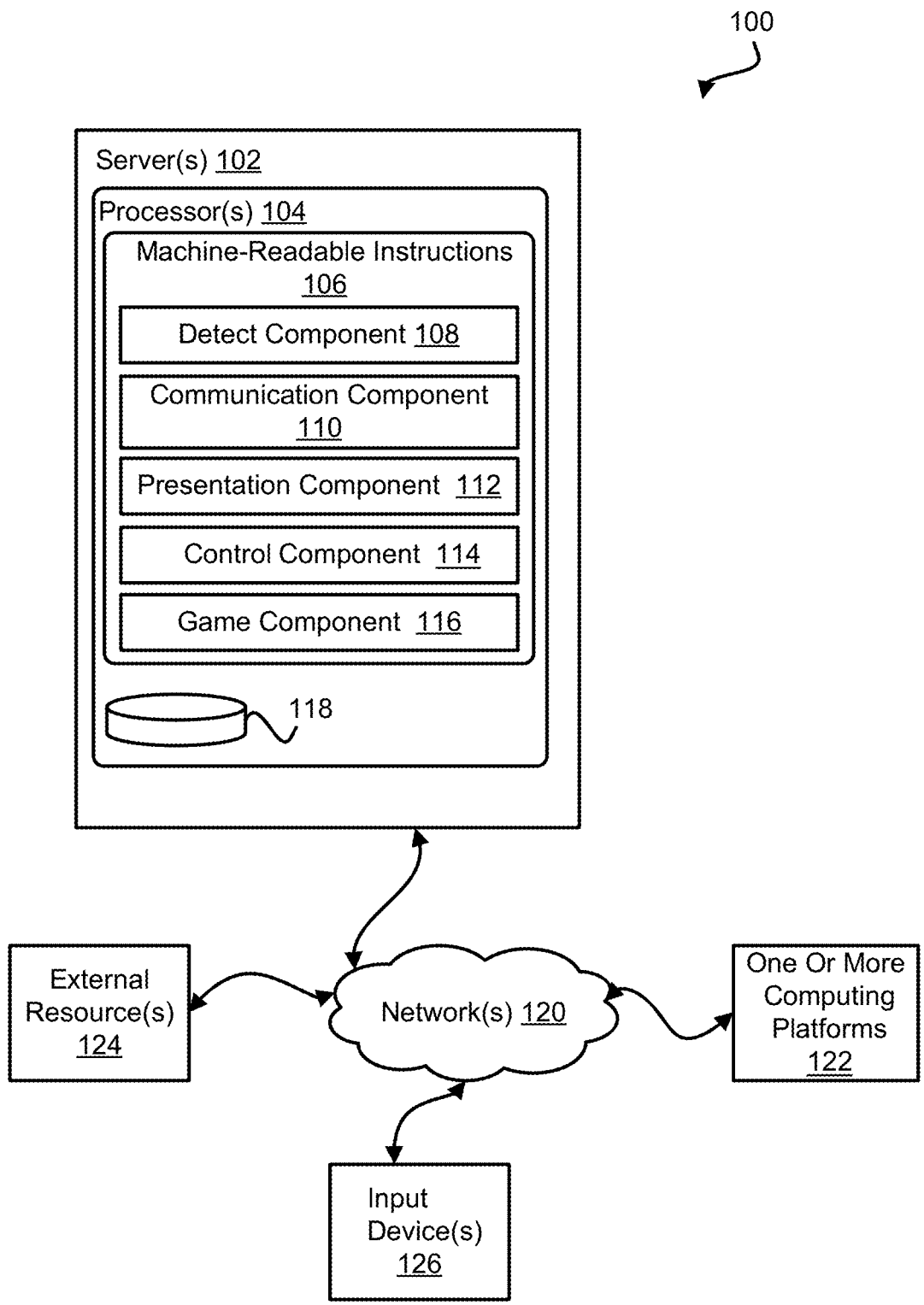
FIG. 1 illustrates a system configured to cause an input device to provide movement-based output, in accordance with one or more implementations.

FIG. 1 illustrates a system 100 configured to cause an input device to provide movement-based output, in accordance with one or more implementations. One or more implementations of the system 100 presented herein may provide a more interactive experience with traditionally passive input devices such as a mouse, a stylus, a game controller, and/or other input devices. For example, one or more implementations may allow the input device to be a learning tool, for augmented reality play, to an assistant to disabled users, among others.

The system 100 may include one or more of one or more servers 102, one or more computing platforms 122, one or more input devices 126, and/or other components. The one or more servers 102 may include one or more of one or more physical processors 104, non-transitory electronic storage 118, and/or other components. The non-transitory electronic storage 118 may be configured to store information utilized by one or more servers 102, one or more computing platforms 122, and/or other components of system 100.

The one or more computing platforms 122 may be remotely located from one or more servers 102. The one or more servers 102 may communicate with one or more computing platforms via client/server architecture, and/or other communication schemes.

By way of non-limiting illustration, individual computing platforms of one or more computing platform 122 may download an application (e.g., non-transitory electronically stored information) configured to provide access to features and/or functions of machine-readable instructions 106. In some implementations, one or more features and/or functions of one or more servers 102 may be attributed as local features and/or functions of one or more computing platforms 122. For example, individual computing platforms of one or more computing platforms 122 may obtain and/or include machine-readable instructions that may be the same or similar to machine-readable instructions 106 of one or more physical processors 104. Individual computing platforms of one or more computing platforms 122 may include one or more of a mobile computing platform (e.g., one or more of a cellular telephone, a smartphone, a laptop, a tablet computer, a virtual reality platform, and/or other computing platforms), a stationary computing platform (e.g., a desktop computer), and/or other computing platforms. In some implementations, a virtual reality platform may include a virtual reality headset (e.g., goggles, glasses, and/or other headset), and/or other virtual reality platform.

Individual computing platforms of one or more computing platforms 122 may include one or more of a display, one or more sensors, one or more audio output devices, and/or other components. A display may be configured to present one or more of individual images, image sequences, video, text, and/or other information. Presentation via a display of a computing platform may be facilitated by one or more processors of the computing platform and/or other components. By way of non-limiting example, presentation may be facilitated by a graphics processing unit (GPU) and/or other components. A display may include one or more of screen, a touchscreen, a monitor, a head-mounted display, a set of screens, and/or other displays. An audio output device may be configured to present audio content in the form of words, sounds, and/or other audio content. An audio output device may include, for example, a speaker.

Individual sensors of an individual computing platform may be configured to generate output signals conveying information utilized by components of the system 100. An individual sensor of an individual computing platform may include an image sensor and/or other sensors.

For example, an image sensor may be configured to generate output signals conveying image information and/or other information. In some implementations, image information may define one or more of an image, an image sequence, a video, and/or other representations of the real-world space. An image may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

Input device(s) 126 may include one or more of one or more drive components, one or more wireless communication devices, one or more output devices, and/or other components.

The one or more drive components may be configured to cause the physical movement of input device(s) 126. The one or more drive components may include one or more of a vibration motor, a motorized wheel, one or more rotor blades, and/or other components that may cause physical movement.

A vibration motor may be configured to vibrate in input device to cause physical movement along a path. By way of non-limiting illustration, vibration may be effectuated in a manner which causes the input device to move from one location to another.

A motorized wheel may be configured to cause physical movement along a path by propelling the input device based on rotation of the wheel. The wheel may be powered by a motor, battery, and/or other components.

One or more rotor blades may be configured to cause physical movement of an input device by generating thrust and/or lift. The one or more rotor blades may be controlled based on speed, direction, and/or other attributes.

The one or more wireless communication devices may be configured to facilitate connection to processor(s) 104 of FIG. 1. A wireless communication device may include a device configured engaged in wireless communication. Wireless communication may include one or more of radio communication, Bluetooth communication, Wi-Fi communication, cellular communication, infrared communication, and/or other wireless communication. A wireless communication device may include one or more of an antenna, a Bluetooth device, Wi-Fi device, and/or other devices.

In some implementations, the input device(s) 126 may include devices configured to provide one or more of visual, auditory, and/or tactile output. An output device may include one or more of a display screen, an audio output device, a tactile output device, a light source, and/or other devices. A display screen may be configured to present visual output in the form of one or more of images, video, and/or text. A display screen may include, for example, a liquid-crystal display (LCD) screen and/or other display screens. A light source may include one or more of a light-emitting diode, laser, a light bulb, and/or other light sources. An audio output device may be configured to present audio content in the form of words, sounds, and/or other audio content. An audio output device may include, for example, a speaker. A tactile output device may be configured to provide tactile output. A tactile output device may include one or more of a heating element, a vibration motor, and/or other tactile output devices.

Figure 3:
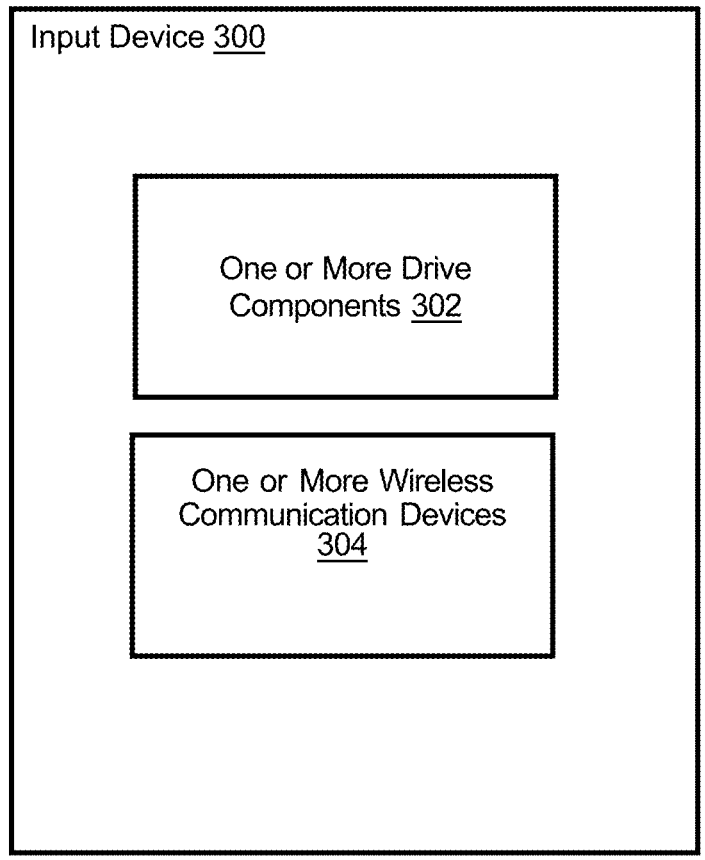
FIG. 3 illustrates an input device, in accordance with one or more implementations.

FIG. 3 illustrates an input device 300, in accordance with one or more implementations. FIG. 3 illustrates example implementation that includes input device 300 (i.e., same as or similar input device(s) 126 in FIG. 1). Input device 300 may include one or more of one or more drive components 302, one or more wireless communication devices 304, and/or other components. Input device 300 may be configured to provide control signals for controlling a graphical user interface. Input device 300 may be configured to obtain motion control signals to cause the input device 300 to perform physical movement in a real-world environment. The input device 300 may be remotely located from one or more servers 102. The input device 300 may be located with corresponding individual computing platform. By way of non-limiting example, input device 300 may include one or more of a computer mouse, a stylus, a game controller, and/or other input devices.

Referring back to FIG. 1, the one or more physical processors 104 may be configured by machine-readable instructions 106. Executing machine-readable instructions 106 may cause one or more physical processors 104 to cause an input device to provide movement-based output. The machine-readable instructions 106 may include one or more computer program components. The one or more computer program components may include one or more of a detection component 108, a communication component 110, a presentation component 112, a control component 114, a game component 116, and/or other components.

Communication component 110 may be configured to establish a connection between one or more physical processors 104 and input device(s) 126. The connection may be wired and/or wireless. As previously mentioned, input device(s) 126 may be configured to provide control signals for controlling a graphical user interface (presented on individual computing platforms).

In some implementations, detection component 108 may be configured to detect presence of an input device. The detection of presence of the input device may be determined based on information received from the input device, image information, and/or other information. In some implementations, detection based on the information received from the individual input device may be accomplished through receiving a radio frequency (e.g., Bluetooth, Wi-Fi), infrared radiation, and/or other information. In some implementations, detection of the input device may be facilitated through handshaking procedure. In some implementations, responsive to detecting and/or identifying the input device, a wireless connection may be established.

In some implementations, detection component 108 may be configured to identify the input device that has been detected as being present in the real-world. Identification may be determined based on information received from individual input devices, and/or other information. Identification of an individual input device may include identification of one or more of an input device type (i.e., mouse, stylus, game controller), an input device model, an input device name, an input device nickname, an input device serial number, and/or other information relating to a given input device. In some implementations, identification based on image information may be accomplished through one or more image-processing techniques (described herein). Identification of an input device may include determining information such as location relative to a computing platform and/or other information.

In some implementations, detection and/or identification of an input device may be determined based on information received from the input device. Obtaining information from an input device may include communication component 110 communicating with the input device to facilitate receiving identification information from the input device. The identification information may include one or more of the input device type (i.e., mouse, stylus, game controller), the input device model, the input device name, the input device nickname, the input device serial number, and/or other information relating to the given input device. Communication may include wireless communication. By way of non-limiting example, wireless communication may include one or more of radio communication, Bluetooth communication, Wi-Fi communication, cellular communication, infrared communication, and/or other wireless communication. For example, an input device may broadcast wireless signals and wait for replies from computing platforms to initiate detection and/or identification. The detection and identification of the motion control signals to the input device may be facilitated by the wireless connection.

Control component 114 may be configured to determine motion control signals for the input device. The motion control signals may dictate physical movement of the input device in a real-world environment. In some implementations, determining the motion control signals for the input device may include determining a path in a real-world environment. A path may comprise two-dimensional and/or a three-dimensional path in the real-world environment. The path may be defined by one or more of a starting point, one or more intermediate points, an end point, direction, speed, velocity between two points, acceleration, deceleration, and/or other variables. A two-dimensional path in the real-world environment may include the input device moving on a surface top, for example. A three-dimensional path in the real-world environment may include moving on a surface top and/or above the surface top (e.g., flying, jumping, lifting, propelling, levitation, etc.), for example.

In some implementations, determining the motion control signals for the input device may include control component 114 generating the motion control signals. As a result, the motion control signals may cause the input device to perform the physical movement along a path.

In some implementations, detection component 108 may be configured to obtain image information and/or other information. As used herein, the term "obtain" (and derivatives thereof) may include active and/or passive retrieval, determination, derivation, transfer, upload, download, submission, and/or exchange of information, and/or any combination thereof. The image information may be derived from output signals of an image sensor of a computing platform, and/or other information. The image information may define one or more images of the real-world environment. By way of non-limiting example, the image information may include the input device, a user object, and/or other objects.

In some implementations, detection component 108 may be configured to detect presence of a user object based on the image information and/or other information. By way of non-limiting example, the user object may include a user's hand, one or more fingers of the user, accessory worn by the user (e.g., a particular bracelet, ring, etc.), and/or other user objects. In some implementations, detection based on the image information may be accomplished through one or more image-processing techniques. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), and/or other techniques.

In some implementations, detection component 108 may be configured to determine user motion of a user object.

Determining the user motion of the user object may be based on image information and/or other information. The image information may be derived from output signals of an image sensor of a computing platform (e.g., external webcam, built-in webcam). An image sensor may include one or more of a charge-coupled device sensor, an active pixel sensor, a complementary metal-oxide semiconductor sensor, an N-type metal-oxide-semiconductor sensor, and/or other devices. In some implementations, determination of user motion based on the image information may be accomplished through one or more image-processing techniques as previously mentioned. Determining user motion of the user object may include determining changes in location of the user object over a period of time, and/or other information.

In some implementations, control component 114 may be configured to determine motion control signals for the input device based on the determined motion of the user object. The motion control signals for the input device determined based on the user motion of the user object may cause the input device to perform the physical movement to avoid collision with the user object. For example, in a gameplay implementation, the input device may physically move to avoid a user's hand (i.e., user object) where the user is trying to grab the input device.

In some implementations, control component 114 may be configured to obtain input information conveying user input. In some implementations, the user input may be via the input device, a second input device, and/or other devices. The user input via the input device may include user-initiated physical movement of the input device and/or other user input. The user-initiated physical movement of the input device my include movement along a two-dimensional and/or a three-dimensional path in a real-world environment. In some implementations, user-initiated physical movement may be determined based on one or more of image information (using one or more image processing techniques), output signals from one or more sensors coupled to the input device, and/or other techniques. In some implementations, one or more sensors coupled to an input device may be one or more sensors traditionally used to determine control inputs for controlling a graphical user interface. By way of non-limiting illustration, the one or more sensors may include one or more of light emitters, optical sensors, mechanical sensors (e.g., measuring rotation of a freely rotating ball), inertial measurement units, and/or other sensors.

In some implementations, the motion control signals may by be determined to cause the input device to accelerate movement along the two-dimensional or the three-dimensional path determined by the user-initiated physical movement. Acceleration of the movement may be based on a speed, a determined velocity, be based on revolutions per minute, a determined amount of time (e.g., three seconds), and/or other information that affect the acceleration of the input device. For example, a user hand may move the input device (e.g., a mouse) in an S-shaped path along a tabletop. Once the input device reaches the center of the first curve, the motion control signals may accelerate the movement along the rest of the S-shaped path.

In some implementations, the motion control signals may cause the input device to restrict the movement along a two-dimensional and/or a three-dimensional path determined by the user-initiated physical movement. The restriction may be based on one or more of a simulated resistance and/or friction, a speed, revolutions per minute, a determined amount of time (e.g., three seconds), and/or other information that restrict movement of the input device. For example, a user hand may move the input device (e.g., a mouse) in an S-shaped path along a tabletop. Once the input device reaches a halfway point of the path, the motion control signals may restrict the movement along the rest of the S-shaped path.

In some implementations, the input information may convey user input via a second input device. The second input device may be separate and distinct from the input device. The user input via the second input device may include user-initiated physical movement of the second input device and/or other user input. The user-initiated physical movement of the second input device may include movement along a two-dimensional and/or a three-dimensional path in the real-world environment by which the input device is configured to mimic. By way of non-limiting illustration, the input device may be controlled to move along the same or similar two-dimensional and/or the three-dimensional path as the second input device.

For example, a first user hand may hold a first input device (e.g., a mouse) of which physically moves along a similar two-dimensional path as a second input device. Such two-dimensional path of which the second input device physically moves along may be based on user-initiated physical movement by a second user. Such implementation may be utilized as a learning tool (e.g., for children, elderly users, disabled users, computer technicians, and/or other users) to promote muscle memory in instances of technology education, a teaching tool, troubleshooting, and/or other instances.

In some implementations, a second input device may be a gaze tracking device. For example, a user with minimal arm and/or hand mobility may utilize a gaze tracking device to control movement of a cursor on a graphical user interface display on a computing platform. The movement of the cursor may be along a path that based on a change of the user's eye gaze at the computing platform. The input device (e.g., a mouse) may physically move along a path in a real-world environment that is the same as or similar to a path of a cursor determined based on the user's eye gaze. In some implementations, a second user may hold the input device (e.g., a mouse) that physically moves along a two-dimensional path in a real-world environment that is the same as or similar to the path based on the change of the user's eye gaze. Such implementation may be utilized as a learning tool for the second user and/or a teaching tool for the user with minimal mobility.

In some implementations, a gaze tracking device may be configured to generate output signals conveying gaze information. The gaze information may include one or more of a viewpoint of a user, a gaze direction of a user, a gaze position, and/or other information. The viewpoint may be specified as a position of the user's head and/or face relative the gaze tracking device. The gaze position may be specified as a convergence point in space. The gaze direction may be specified as a vector having an origin at the viewpoint and extending toward the gaze position. In some implementations, a gaze tracking device may include one or more of one or more sensors, one or more emitters, and/or other components. An emitter may be configured to emit light. The emitter may comprise an infrared (IR) emitter configured to emit IR light. In some implementations, a sensor may comprise one or more of an IR sensor, an image sensor, and/or other sensors. A sensor of a gaze tracking device may comprise an IR camera and/or other devices. In some implementations, output signals of one or more sensors of a gaze tracking device may convey one or more of positions of one or more pupils of a user relative to a locus of a reflectance of light emitted by an emitter of the gaze tracking device, and/or other information. Output signals of one or more sensors of a gaze tracking device may be used to determine gaze information and/or other information.

Communication component 110 may be configured to effectuate communication of the motion control signals to an input device. Thus, the input device may execute the motion control signals to perform the physical movement in the real-world environment. The communication of the motion control signals to the input device 126 may be facilitated by a wireless connection.

In some implementations, presentation component 112 may be configured to effectuate presentation of visual content on individual displays of individual computing platforms. The visual content may be generated based on virtual content information, and/or other information. The virtual content information may define virtual content. The virtual content may include a simulated space, virtual space, virtual objects, and/or other virtual content. The simulated space may include one or more of the virtual space, the virtual objects, and/or other virtual content. The visual content may include views of virtual content superimposed over views of the real-world defined by the image information. Views of virtual content superimposed over views of the real-world may define an augmented reality space. In some implementations, presentation component 112 may be configured to effectuate presentation of the virtual content on a display of a computing platform in sync with the physical movement of the input device. The physical movement of the input device may be synchronized with virtual movement of a virtual object in the simulated space. The virtual object may include, for example, a game entity of game. The game entity may be a user controlled entity (e.g., avatar), and/or a non-user controlled entity (e.g., non-player character or "NPC").

The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the simulated space is determined by a computer program component is not intended to be limiting. The computer program component may be configured to express the simulated space in a more limited, or richer, manner. For example, views determined for the simulated space representing the state of the instance of the simulated space may be selected from a limited set of graphics depicting an event in a given place within the simulated space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the simulated space are contemplated.

Within the instance(s) of the simulated space executed by presentation component 112, one or more users may control game entities, groups of game entities, simulated physical phenomena (e.g., wind, rain, earthquakes, and/or other phenomena), and/or other elements within the simulated space to interact with the simulated space and/or other users. The game entities may include virtual characters, such as avatars, group entities, and/or other considerations. A given game entity may be controlled by a user with which it is associated. The user-controlled element(s) may move through and interact with the simulated space (e.g., non-user characters in the simulated space, other objects in the simulated space). The user-controlled elements controlled by and/or associated with one or more users may be created and/or customized by the one or more users, based on information received by a given client computing platform, and/or may be based on other information. One or more users may have an "inventory" of virtual items, game entities, and/or currency that the one or more users can use (e.g., by manipulation of a virtual character or other user-controlled element, and/or other items) within the simulated space.

A user may participate in the instance of the simulated space by controlling one or more of the available user-controlled game entities in the simulated space. Control may be exercised through control inputs such as entry, selection, and/or commands input by the one or more users. Other users of the simulated space may interact with the one or more users through communications exchanged within the simulated space. Such communications may include one or more of textual chat, instant messages, private messages, voice communications, and/or other communications. Communications may be received and entered by the users via their respective computing platforms. Communications may be routed to and from the appropriate users through network(s) 120 and/or through communications which are external to the system 100 (e.g., text messaging services associated with the users).

The instance of the simulated space and/or an online game that takes place therein may be persistent. That is, the simulated space and/or the game may continue on whether or not individual players are currently logged in and/or participating in the game. A user that logs out of the simulated space and then logs back in some time later may find the simulated space has been changed through the interactions of other players with the simulated space during the time the player was logged out. These changes may include changes to the simulated physical space, changes in the user's inventory, changes in other user's inventories, changes experienced by non-player characters, changes to the virtual items available for use in the game, and/or other changes In some implementations, individual virtual objects may be configured to experience locomotion. The virtual objects may have one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture, food), a shape (e.g., a star-shape), and/or other entities and/or objects.

The game component 116 may be configured to facilitate gameplay via presentation of virtual content and/or motion of input devices. In some implementations, game component 116 may be configured to effectuate presentation of a game user interface on individual computing platforms. In some implementations, a game user interface may include one or more user interface elements. A user interface element may include one or more of a game score indicator, a task description, avatar customization element, voice recognition through avatar activation, social feed/share button, avatar/multi-player Scoreboard, a comment Section and/or other elements. A task description may provide information related to current gameplay, including, for example, a current task to be completed, a subsequent task to be completed, and/or other information. The game score indicator may display a game score and/or other information.

In some implementations, game component 116 may be configured to modify individual virtual objects based on user input, a particular game, and/or other information. In some implementations, modification may include one or more of causing one or more virtual objects to disappear, causing one or more virtual objects to experience locomotion, and/or other modifications.

By way of non-limiting illustration, gameplay may include steering a virtual vehicle using an input device. The input device may be configured to effectively spin an opposite direction to provide resistance/feedback when doing a turn. In this example, the physical movement initiated in the input device may comprise a rotational movement. Accordingly, in some implementations, alternatively and/or in addition to determining motion control signals based on a two-dimensional and/or a three-dimensional path, motion control signals may be determined based on a rotational movement to cause the input device to perform the rotational movement in the real-world environment.

It is noted that the above description of gameplay and/or modifications to virtual objects are provided for illustrative purposes only and are not to be considered limiting. Instead, those skilled in the art may appreciate that different types of gameplay and/or virtual object modifications may be provided within the scope of the present disclosure.

Figure 4:
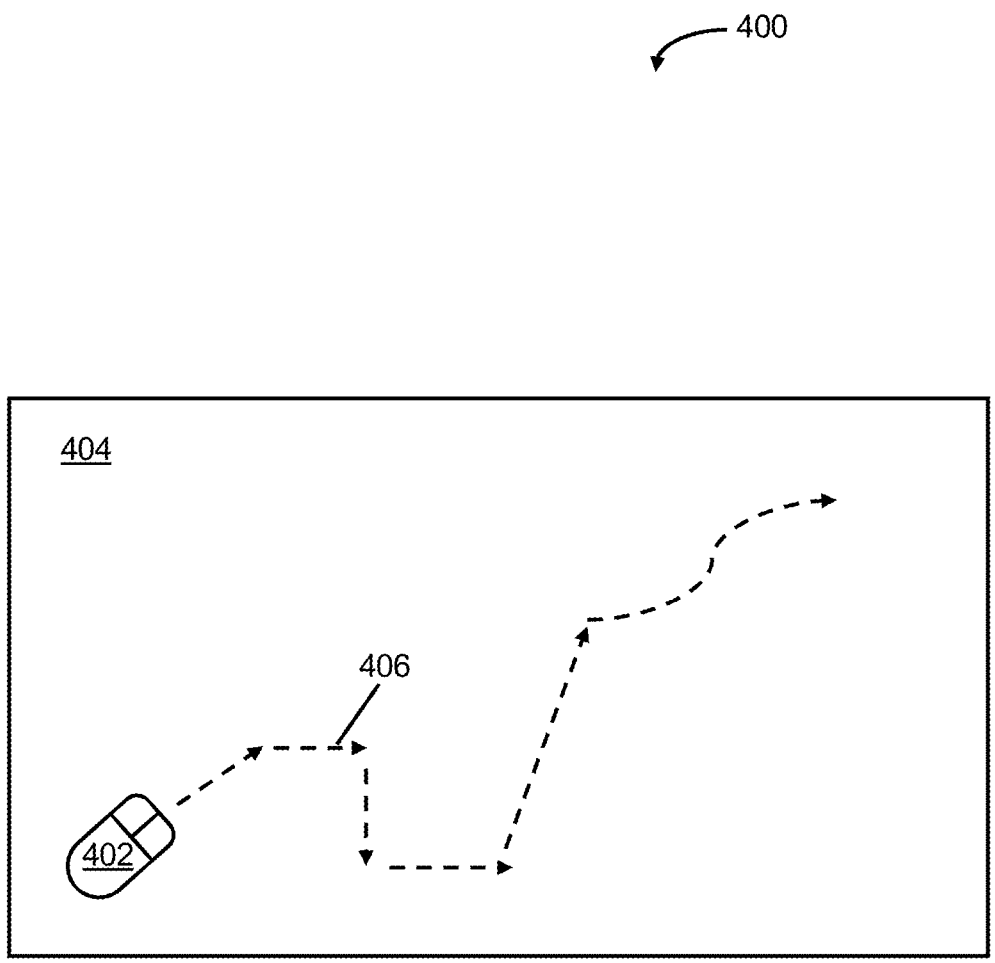
FIG. 4 illustrates an implementation of a system configured to cause an input device to provide movement-based output.

FIG. 4 illustrates an implementation of a system configured to cause an input device to provide movement-based output. FIG. 4 illustrates scenario 400 including a mouse 402 (i.e., input device) on a tabletop 404. Mouse 402 may move various directions along a path 406 around tabletop 404 based on motion control signals communicated to mouse 402. Mouse 402 may physically move along path 406 straight, turn slightly right, turn perpendicularly right, turn perpendicularly left, turn slightly left, move in curved directions, and/or physical move in other ways.

Figure 5:
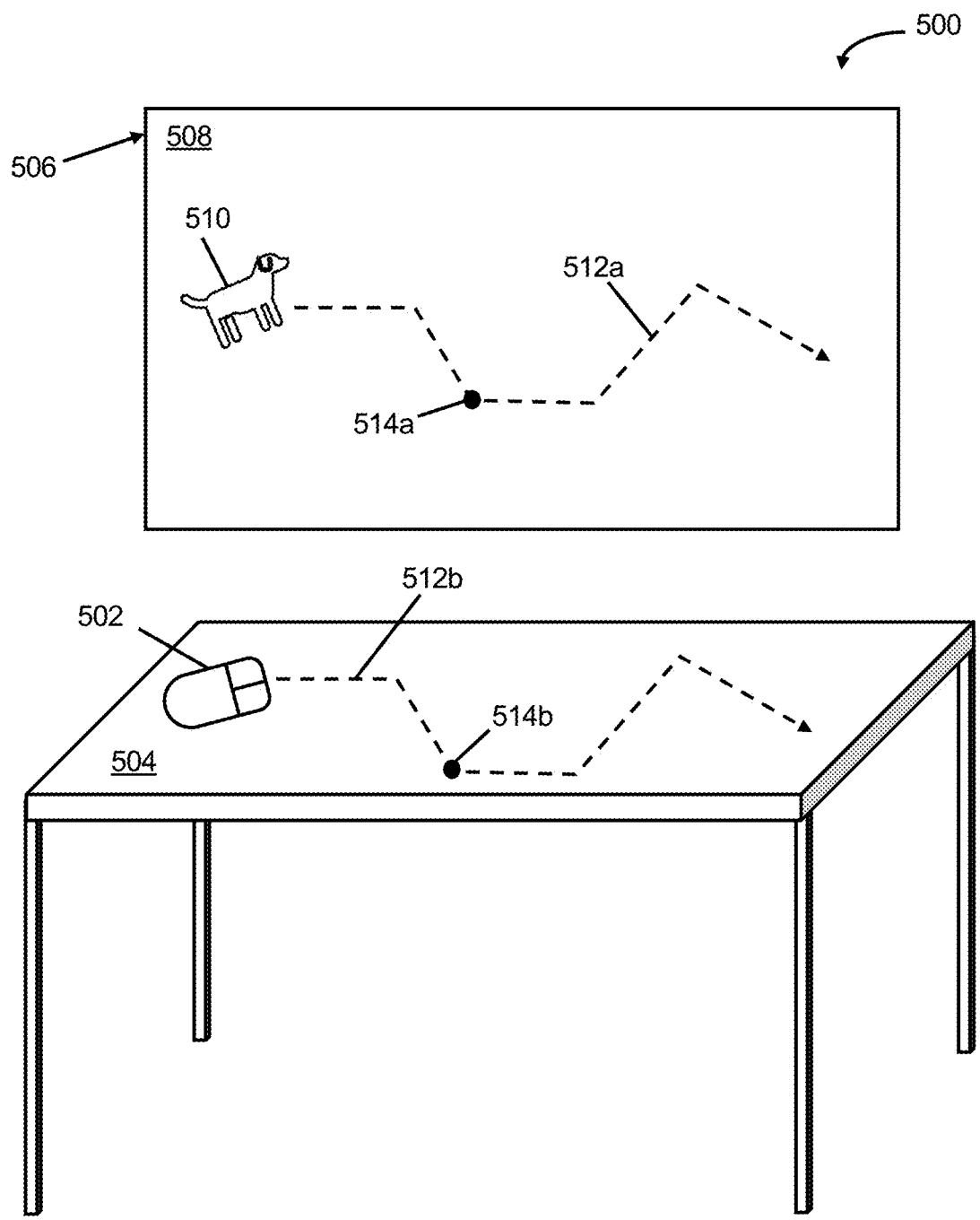
FIG. 5 illustrates an implementation of a system configured to cause an input device to provide movement-based output.

FIG. 5 illustrates an implementation of a system configured to cause an input device to provide movement-based output. FIG. 5 illustrates scenario 500 including a mouse 502 (i.e., input device) on a tabletop 504, and a display device 506 (e.g., computing platform) presenting a simulated space 508. Simulated space 508 may include a virtual object 510 (e.g., virtual dog) virtually moving along a path 512a. Based on virtual object 510 virtually moving along path 512a, motion control signals may be communicated to mouse 502 to cause mouse 502 to synchronously move along a similar path 512b on tabletop 504. When virtual object 510 virtually reaches intermediate point 514a, virtual object 510 may "run" until the end of path 512a. Likewise, the motion control signals communicated to mouse 502 may cause mouse 502 to physically move mouse 502 to intermediate point 514b. When mouse 502 physically moves to intermediate point 514b, the motion control signals may cause mouse 502 to accelerate until the end of path 512b.

Figure 6:
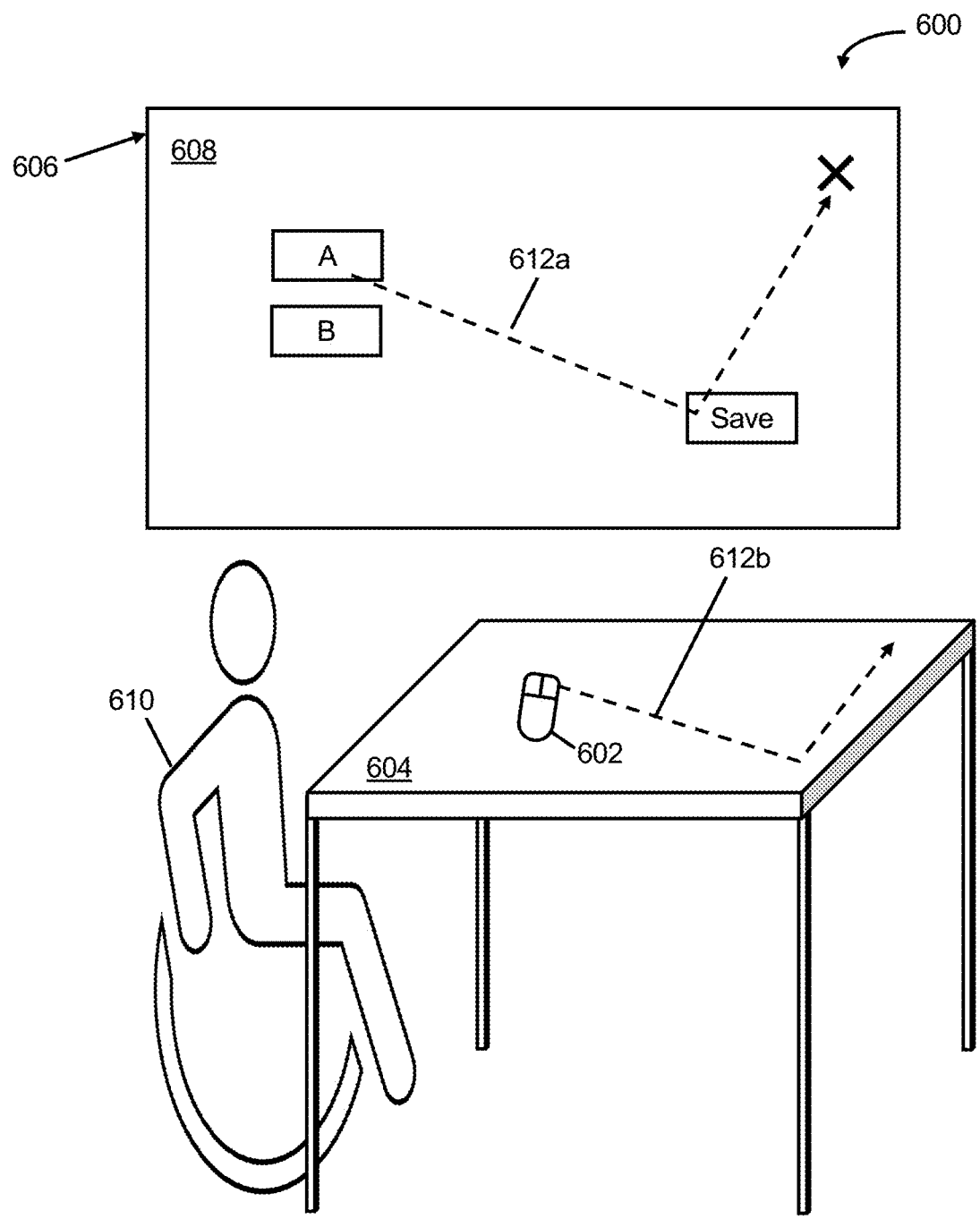
FIG. 6 illustrates an implementation of a system configured to cause an input device to provide movement-based output.

FIG. 6 illustrates an implementation of a system configured to cause an input device to provide movement-based output. FIG. 6 illustrates scenario 600 including a mouse 602 (i.e., input device) on a tabletop 604, and a display device 606 presenting a simulated space 608 (e.g., web browser). A user 610 may be utilizing a gaze tracking device (not shown in FIG. 6) by which eye gaze movement of user 610 related to virtual content displayed on display device 606 determine a path 612a. Path 612a may represent user 610 selecting user interface elements (e.g., button A, Save button, then close button). Based on the eye gaze moving along path 612a, motion control signals may be communicated to mouse 602 to cause mouse 602 to synchronously move along a similar path 612b on tabletop 604.

Returning to FIG. 1, server(s) 102, one or more computing platforms 122, one or more input devices 126, external resource(s) 124, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media.

External resource(s) 124 may include sources of information, hosts, and/or providers of information outside of system 100, external entities participating with system 100, and/or other resources. In some implementations, some or all of the functionality attributed herein to external resource(s) 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
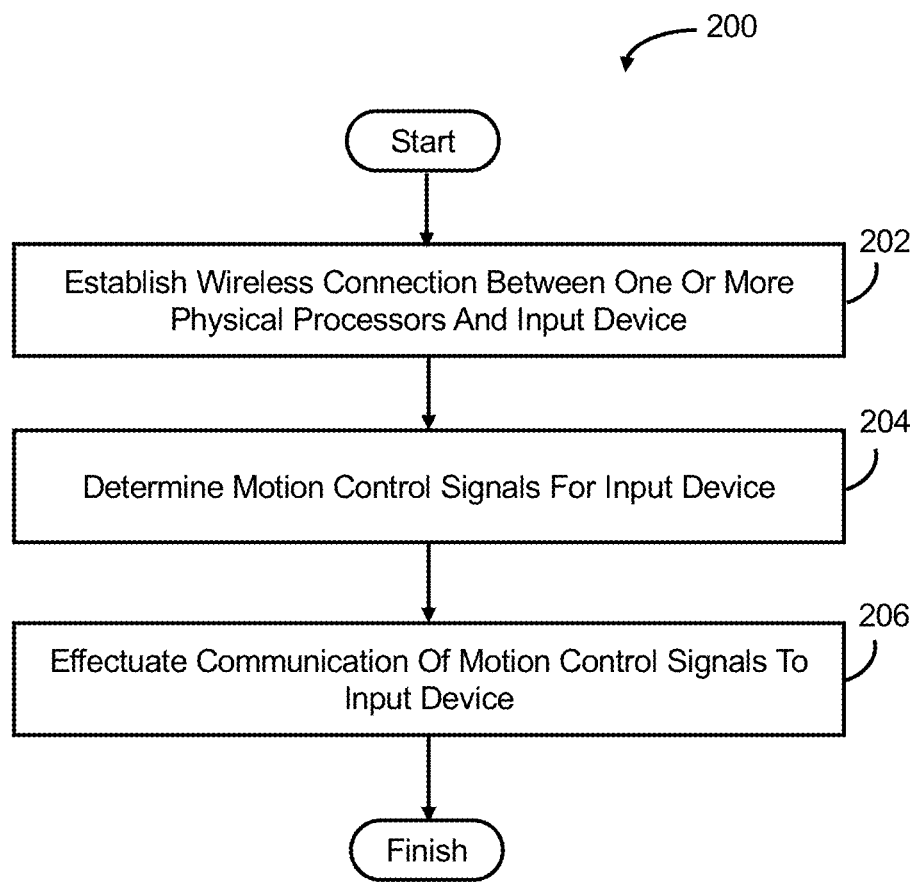
FIG. 2 illustrates a method to cause an input device to provide movement-based output, in accordance with one or more implementations.

FIG. 2 illustrates a method 200 to cause an input device to provide movement-based output. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more input devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, establish a connection between the one or more physical processors and an input device. The connection may be wired and/or wireless. The input device may be configured to provide control signals for controlling a graphical user interface. In some implementations, operation 202 may be performed by one or more physical processors executing a communication component the same as or similar to communication component 110 (shown in FIG. 1 and described herein).

At an operation 204, determine motion control signals for the input device. The motion control signals may dictate physical movement of the input device in a real-world environment. In some implementations, operation 204 may be performed by one or more physical processors executing a control component the same as or similar to control component 114 (shown in FIG. 1 and described herein).

At an operation 206, effectuate communication of the motion control signals to the input device. Thus, the input device may perform the physical movement in the real-world environment. In some implementations, operation 206 may be performed by one or more physical processors executing a communication component the same as or similar to communication component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to cause an input device to provide movement-based output, the system comprising:
   one or more physical processors programmed by machine-readable instructions such that execution of the machine-readable instructions by the one or more physical processors causes the one or more physical processors to:
   establish a connection between the one or more physical processors and the input device, the input device being configured to provide control signals for controlling a graphical user interface;
   determine a two-dimensional path in a real-world environment by defining a starting point on a real-world surface, an intermediate point on the real-world surface, and an ending point on the real-world surface;
   generate motion control signals for the input device, the motion control signals dictating physical movement of the input device in the real-world environment, such that the physical movement of the input device includes movement along the two-dimensional path on the real-world surface; and
   effectuate communication of the motion control signals to the input device thereby causing the input device to perform the physical movement in the real-world environment along the two-dimensional path on the real-world surface.

2. The system of claim 1, wherein the input device includes a drive component configured to cause the physical movement of the input device, and one or more wireless communication devices.

3. The system of claim 2, wherein the drive component includes a motorized wheel.

4. The system of claim 3, wherein the input device is one of a computer mouse, a stylus, or a game controller.

5. The system of claim 1, wherein the one or more physical processors are further configured by the machine-readable instructions to:
obtain input information conveying user input via the input device, the user input via the input device including user-initiated physical movement of the input device; and
generate the motion control signals based on the input information.

6. The system of claim 5, wherein the user-initiated physical movement of the input device includes movement along the two-dimensional path, and wherein the motion control signals cause the input device to accelerate and/or restrict the movement along the two-dimensional path.

7. The system of claim 1, wherein the one or more physical processors are further configured by the machine-readable instructions to:
obtain input information conveying user input via a second input device, the second input device being separate and distinct from the input device; and
generate the motion control signals based on the input information.

8. The system of claim 7, wherein:
the user input via the second input device includes user-initiated physical movement of the second input device in a second real-world environment, the user-initiated physical movement of the second input device includes movement along a second two-dimensional path in the second real-world environment; and
the two-dimensional path in the real-world environment is similar to the second two-dimensional path in the second real-world environment.

9. The system of claim 1, wherein the one or more physical processors are further configured by the machine-readable instructions to:
effectuate presentation of virtual content on a display of a computing platform in sync with the physical movement of the input device,
wherein the virtual content includes a simulated space comprising one or more virtual objects, and wherein the physical movement of the input device is synchronized with virtual movement of a virtual object in the simulated space.

10. A system configured to cause an input device to provide movement-based output, the system comprising:
one or more physical processors programmed by machine-readable instructions such that execution of the machine-readable instructions by the one or more physical processors causes the one or more physical processors to:
establish a connection between the one or more physical processors and the input device, the input device being configured to provide control signals for controlling a graphical user interface;
determine a two-dimensional path in a real-world environment;
generate motion control signals for the input device, the motion control signals dictating physical movement of the input device in the real-world environment, such that the physical movement of the input device includes movement along the two-dimensional path;
effectuate communication of the motion control signals to the input device thereby causing the input device to perform the physical movement in the real-world environment;
obtain image information, the image information defining one or more images of the real-world environment;
detect, based on the image information, presence of a user object;
determine, based on the image information, user motion of the user object;
determine the motion control signals for the input device based on the user motion of the user object; and
wherein the motion control signals for the input device determined based on the user motion of the user object cause the input device to perform the physical movement and to avoid collision with the user object.

11. A method to cause an input device to provide movement-based output, the method comprising:
establishing a connection between the one or more physical processors and the input device, the input device being configured to provide control signals for controlling a graphical user interface;
determining a two-dimensional path in a real-world environment by defining a starting point on a real-world surface, an intermediate point on the real-world surface, and an ending point on the real-world surface;
generating motion control signals for the input device, the motion control signals dictating physical movement of the input device in the real-world environment, such that the physical movement of the input device includes movement along the two-dimensional path on the real-world surface; and
effectuating communication of the motion control signals to the input device thereby causing the input device to perform the physical movement in the real-world environment along the two-dimensional path on the real-world surface.

12. The method of claim 11, wherein the input device includes a drive component configured to cause the physical movement of the input device, and one or more wireless communication devices.

13. The method of claim 12, wherein the drive component includes a motorized wheel.

14. The method of claim 13, wherein the input device is one of a computer mouse, a stylus, or a game controller.

15. The method of claim 11, further comprising:
obtaining input information conveying user input via the input device, the user input via the input device including user-initiated physical movement of the input device; and
generating the motion control signals based on the input information.

16. The method of claim 15, wherein the user-initiated physical movement of the input device includes movement along the two-dimensional path, and wherein the motion control signals cause the input device to accelerate and/or restrict the movement along the two-dimensional path.

17. The method of claim 11, further comprising:
obtaining input information conveying user input via a second input device, the second input device being separate and distinct from the input device; and
generating the motion control signals based on the input information.

18. The method of claim 17, wherein:
the user input via the second input device includes user-initiated physical movement of the second input device in a second real-world environment, the user-initiated physical movement of the second input device includes movement along a second two-dimensional path in the second real-world environment; and
the two-dimensional path in the real-world environment is similar to the second two-dimensional path in the second real-world environment.

19. The method of claim 11, further comprising:
effectuating presentation of virtual content on a display of a computing platform in sync with the physical movement of the input device; and
wherein the virtual content includes a simulated space comprising one or more virtual objects, and wherein the physical movement of the input device is synchronized with virtual movement of a virtual object in the simulated space.

20. A method to cause an input device to provide movement-based output, the method comprising:
establishing a connection between the one or more physical processors and the input device, the input device being configured to provide control signals for controlling a graphical user interface;
determining a two-dimensional path in a real-world environment;
generating motion control signals for the input device, the motion control signals dictating physical movement of the input device in the real-world environment, such that the physical movement of the input device includes movement along the two-dimensional path;
effectuating communication of the motion control signals to the input device thereby causing the input device to perform the physical movement in the real-world environment;
obtaining image information, the image information defining one or more images of the real-world environment;
detecting, based on the image information, presence of a user object;
determining, based on the image information, user motion of the user object; determining the motion control signals for the input device based on the user motion of the user object; and
wherein the motion control signals for the input device determined based on the user motion of the user object cause the input device to perform the physical movement and to avoid collision with the user object.

* * * * *